(12) United States Patent
Chamberlin et al.

(10) Patent No.: US 9,006,943 B2
(45) Date of Patent: Apr. 14, 2015

(54) ELECTRO-DYNAMIC MACHINE WITH COOLANT CHARGEABLE BLADDER

(75) Inventors: Bradley D. Chamberlin, Pendleton, IN (US); Colin Hamer, Noblesville, IN (US)

(73) Assignee: Remy Technologies, L.L.C., Pendleton, IN (US)

(*) Notice: Subject to any disclaimer, the term of this patent is extended or adjusted under 35 U.S.C. 154(b) by 172 days.

(21) Appl. No.: 13/611,583

(22) Filed: Sep. 12, 2012

(65) Prior Publication Data

US 2014/0070636 A1 Mar. 13, 2014

(51) Int. Cl.
H02K 9/197 (2006.01)
H02K 9/16 (2006.01)
H02K 3/24 (2006.01)
H02K 9/19 (2006.01)

(52) U.S. Cl.
CPC ... H02K 3/24 (2013.01); H02K 9/19 (2013.01)

(58) Field of Classification Search
CPC .................................. H02K 3/24; H02K 9/19
USPC .......................................... 310/54, 52, 58, 53
See application file for complete search history.

(56) References Cited

U.S. PATENT DOCUMENTS

| | | | |
|---|---|---|---|
| 2,722,616 A * | 11/1955 | Moses | 310/54 |
| 2,727,161 A * | 12/1955 | Kilner et al. | 310/64 |
| 2,873,393 A * | 2/1959 | Baudry | 310/55 |
| 2,917,644 A * | 12/1959 | Laffoon et al. | 310/64 |
| 3,167,674 A * | 1/1965 | Woodward, Jr. | 310/105 |
| 3,497,737 A * | 2/1970 | Philofsky | 310/54 |
| 3,624,432 A * | 11/1971 | Merz | 310/53 |
| 3,634,705 A * | 1/1972 | Fidei | 310/57 |
| 3,733,503 A | 5/1973 | Potter | |
| 3,995,181 A * | 11/1976 | Suit | 310/58 |
| 4,117,358 A * | 9/1978 | Flick | 310/59 |
| 4,323,803 A * | 4/1982 | Danko et al. | 310/59 |
| 4,739,204 A * | 4/1988 | Kitamura et al. | 310/68 D |
| 5,081,382 A * | 1/1992 | Collings et al. | 310/54 |
| 5,703,418 A * | 12/1997 | Assa | 310/12.29 |
| 5,796,197 A | 8/1998 | Bookout | |
| 6,222,289 B1 | 4/2001 | Adames | |
| 6,300,693 B1 | 10/2001 | Poag et al. | |
| 6,617,715 B1 | 9/2003 | Harris et al. | |
| 6,822,352 B2 | 11/2004 | Nimz et al. | |
| 6,933,633 B2 | 8/2005 | Kaneko et al. | |
| 7,034,428 B2 | 4/2006 | Cai et al. | |
| 7,242,124 B2 | 7/2007 | Ogawa et al. | |
| 7,302,042 B2 | 11/2007 | Hansen et al. | |
| 7,626,292 B2 | 12/2009 | Baumann et al. | |
| 7,675,209 B2 | 3/2010 | Masoudipour et al. | |
| 7,847,465 B2 | 12/2010 | Tokizawa | |

(Continued)

FOREIGN PATENT DOCUMENTS

JP 2006014516 1/2006
KR 20100111485 10/2010

OTHER PUBLICATIONS

International Search Report issued in PCT/US2013/059397 mailed Dec. 23, 2013, 6 pgs.

(Continued)

Primary Examiner — Alex W Mok
(74) Attorney, Agent, or Firm — Cantor Colburn LLP

(57) ABSTRACT

An electro-dynamic machine is provided and includes stator assembly end turns and a coolant chargeable bladder disposable to contact the end turns.

20 Claims, 4 Drawing Sheets

(56) References Cited

U.S. PATENT DOCUMENTS

| | | |
|---|---|---|
| 7,946,118 B2 | 5/2011 | Hippen et al. |
| 7,948,126 B2 | 5/2011 | Fulton et al. |
| 7,952,243 B2 | 5/2011 | Sopp |
| 8,129,874 B2 | 3/2012 | Lambka et al. |
| 8,154,158 B2 | 4/2012 | Saban et al. |
| 2005/0268464 A1 | 12/2005 | Burjes et al. |
| 2008/0001485 A1* | 1/2008 | Upadhyay et al. ............... 310/42 |
| 2008/0284263 A1 | 11/2008 | Dessirier |
| 2009/0108715 A1 | 4/2009 | Sopp |
| 2010/0141062 A1 | 6/2010 | Chamberlin et al. |
| 2010/0244594 A1 | 9/2010 | Murakami et al. |
| 2010/0320851 A1 | 12/2010 | Lambka et al. |
| 2011/0083834 A1 | 4/2011 | Braun et al. |
| 2011/0148229 A1 | 6/2011 | Esse |
| 2011/0234029 A1* | 9/2011 | Pal .................................. 310/54 |
| 2011/0273039 A1 | 11/2011 | Chamberlin et al. |
| 2011/0285222 A1 | 11/2011 | Chamberlin et al. |
| 2011/0298316 A1 | 12/2011 | Bradfield |
| 2011/0298317 A1 | 12/2011 | Bradfield |
| 2011/0298318 A1* | 12/2011 | Bradfield ......................... 310/58 |
| 2011/0298319 A1* | 12/2011 | Chamberlin et al. ........... 310/61 |
| 2011/0304227 A1 | 12/2011 | Bradfield |
| 2011/0309698 A1 | 12/2011 | Kirkley, Jr. et al. |
| 2012/0013207 A1 | 1/2012 | Chamberlin et al. |
| 2012/0062056 A1 | 3/2012 | Bradfield |
| 2012/0074799 A1 | 3/2012 | Bradfield |
| 2012/0080117 A1 | 4/2012 | Bradfield |
| 2012/0091838 A1 | 4/2012 | Miyamoto et al. |
| 2012/0212083 A1 | 8/2012 | Himmelmann |

OTHER PUBLICATIONS

Written Opinion issued in PCT/US2013/059397 mailed Dec. 23, 2013, 6 pgs.

* cited by examiner

ELECTRO-DYNAMIC MACHINE WITH COOLANT CHARGEABLE BLADDER

BACKGROUND OF THE INVENTION

The subject matter disclosed herein relates to electro-dynamic machines and, more particularly, to electro-dynamic machines having coolant bladders.

Electro-dynamic machines generally operate by using electricity to generate mechanical energy. The electricity is supplied to conductive elements that are supported on a stator assembly to surround a rotor having, for example in a permanent magnet motor, magnetic elements. The flow of current through the conductive elements generates a magnetic flux that is applied to the magnetic elements on the rotor, which causes the rotor to rotate.

Thermal management of electro-dynamic machine is critical to lifecycles, reliability and continuous performance levels. Thermal management generally requires that heat be removed from the conductive elements in various ways. Two such heat removal methods include the use of a cooling jacket around the stator assembly and spraying coolant onto the conductive elements.

BRIEF DESCRIPTION OF THE INVENTION

According to one aspect of the invention, an electro-dynamic machine is provided and includes stator assembly end turns and a coolant chargeable bladder disposable to contact the end turns.

According to another aspect of the invention, an electro-dynamic machine is provided and includes a stator assembly having end turns configured to carry current in association with rotation of a rotor, a bladder element including a bladder wall, which is receptive of coolant and which is disposable to contact the end turns such that the coolant is disposable to remove heat from the end turns and a plumbing system configured to pressurize the coolant.

According to yet another aspect of the invention, a method of operating an electro-dynamic machine is provided and includes forming a stator assembly having end turns configured to carry current in association with rotor rotation, disposing a coolant receptive bladder to contact the end turns such that coolant receivable by the bladder is disposable to remove heat from the end turns and pressurizing the coolant receivable by the bladder.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
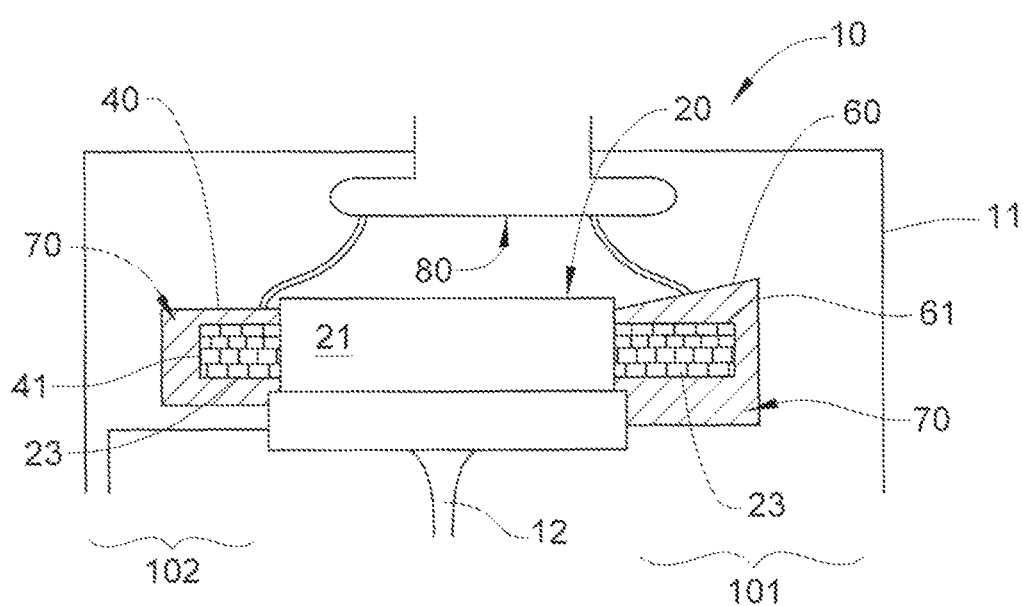
FIG. 1 is a schematic side view of an electro-dynamic machine.

With reference to FIG. 1, an electro-dynamic machine 10 is provided as a motor or a generator. The electro-dynamic machine 10 includes a housing 11 disposed about a rotor 12, a stator assembly 20, which is housed in the housing 11, a first bladder element 40, a second bladder element 60 and a plumbing system 80. The first bladder element 40 and the second bladder element 60 could be provided as a single combined element or as separate elements. For purposes of clarity and brevity, the following description will refer to the latter of these two cases but it is to be understood that this is not intended to limit the scope of the description in any way.

The stator assembly 20 is formed about the rotor 12 and includes a non-rotating stator body 21 and conductive elements (not shown). The conductive elements are disposed to extend through the stator body 21 and have end turns 23 disposed at opposite ends of the stator body 21. The conductive elements and the end turns 23 are configured to be supplied with current whereby the current induces generation of a magnetic flux that may be applied to permanent magnetic elements in the rotor 12 to thereby drive rotation of the rotor 12. Alternatively, rotation of the rotor 12 can be employed to drive current in the conductive elements.

Figure 2:
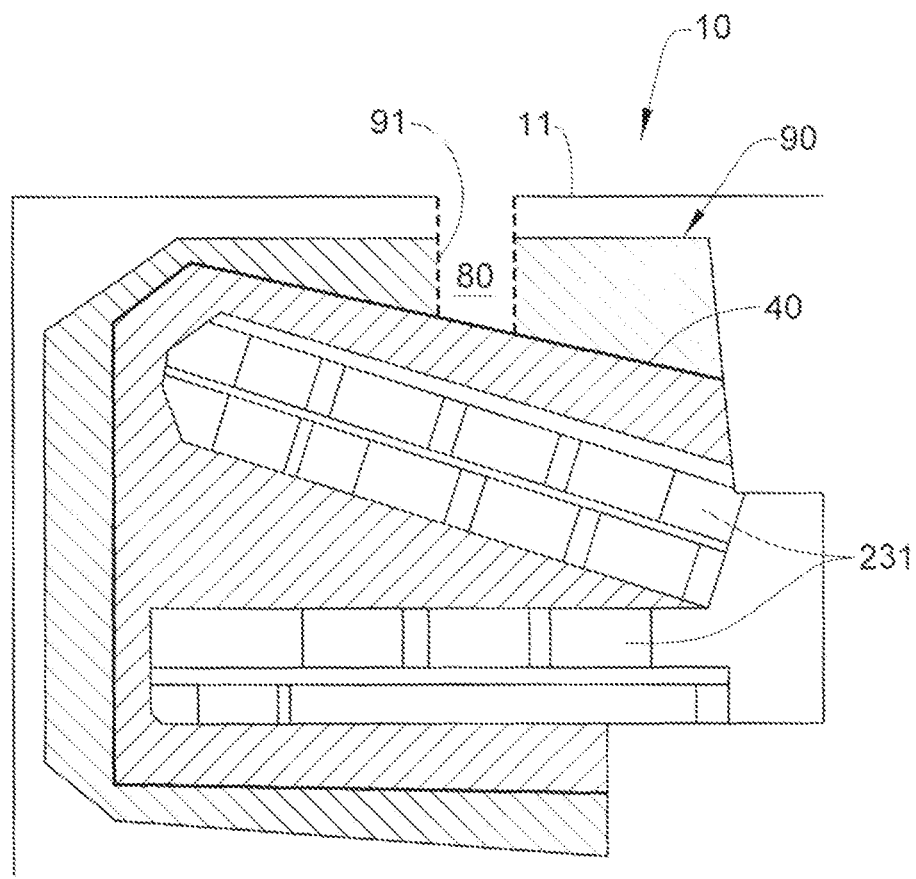
FIG. 2 is a schematic view of a cooling jacket of an electro-dynamic machine.

In accordance with embodiments and, with reference to FIG. 2, the electro-dynamic machine 10 may further include a cooling jacket 90. As shown in FIG. 2, the cooling jacket 90 may be disposed within the housing 11 and configured to support the first bladder element 40 and/or the second bladder element 60. The plumbing system 80 may be coupled to the first and second bladder elements 40 and 60 via openings 91 defined in the cooling jacket 90.

With reference back to FIG. 1, the end turns 23 are disposed in a forward section 101 of the electro-dynamic machine 10 and in a rear section 102 of the electro-dynamic machine 10. The end turns 23 may be provided in a block-shaped configuration, as shown in FIG. 1. In an alternative embodiment, with reference to FIGS. 2 and 3, the end turns 23 may be provided in a V-shaped configuration as described for example in U.S. patent application Ser. No. 13/565,525, entitled "ANGLED WELD END TURNS FOR COOLANT ACCESS," the disclosure of which is incorporated herein by reference. In the V-shaped configuration, pairs of complementary end turns 23 are welded together to form a welded pair 231 with each welded pair 231 being separated from another welded pair 231. The V-shaped configuration provides for additional cooling of the end turns 23 by way of an increase in the surface area of the end turns 23 that is exposed to coolant.

It is to be understood that additional configurations are possible whereby each welded pair 231 is further divided such that further increases in the surface area of the end turns 23 that is exposed to coolant are achievable.

Figure 3:
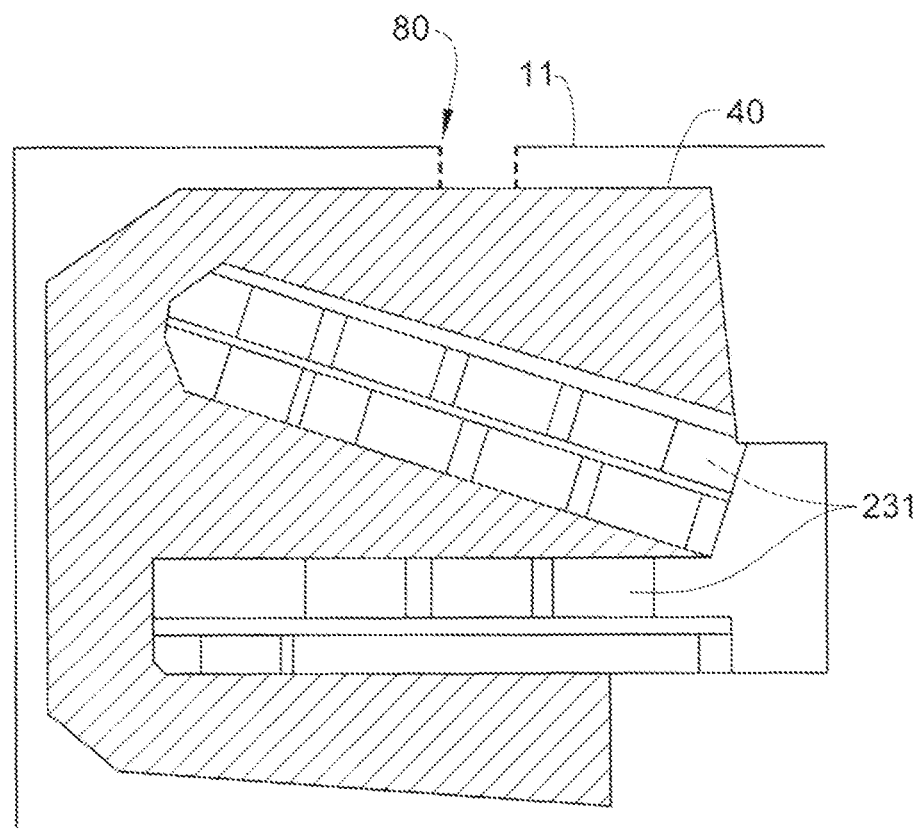
FIG. 3 is an enlarged schematic side view of an electro-dynamic machine in accordance with embodiments.

In the embodiment of FIG. 1, the first bladder element 40 is interposed between the housing 11 and the end turns 23 in the rear section 102 whereas the second bladder element 60 is interposed between the housing 11 and the end turns 23 in the forward section 101. In the embodiment of FIG. 3, the first bladder element 40 is similarly configured but additionally occupies the space between the welded pairs 231 of end turns 23.

The first bladder element 40 and the second bladder element 60 each include a bladder wall 41, 61 that is configured to be receptive of coolant 70 and to contain the coolant 70 therein. The respective bladder walls 41, 61 may be formed of a compliant, deformable and/or flexible material, such as silicone, and are disposable to contact the end turns 23 such that the coolant 70 is thereby disposable to remove heat from the end turns 23. This heat is generated when the end turns 23 are supplied with current to drive the rotation of the rotor 12 and is a primary source of heat generation in the electro-dynamic machine 10 as a whole. The coolant 70 may include air, water, oil or another suitable fluid.

The first and second bladder elements 40 and 60 may be configured to maintain contact over at least a predefined surface area of the end turns 23 at all times whereby some degree of heat removal is generally achievable. When additional heat removal is required, however, the plumbing system 80 is actuated to charge the first and second bladder elements 40 and 60 with additional coolant. This causes the first and second bladder elements 40 and 60 to enlarge and leads to an increase in a surface area of contact between the respective bladder walls 41, 61 and the ends turns 23. In this way, an increase in the degree of heat removal from the end turns 23 can be achieved.

Figure 4:
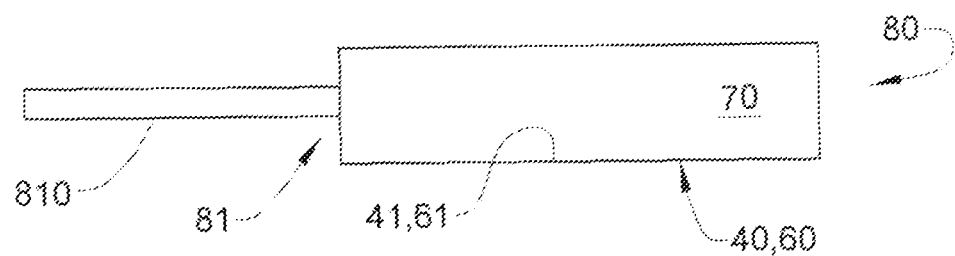
FIG. 4 is a schematic diagram of a plumbing system of an electro-dynamic machine.
Figure 5:
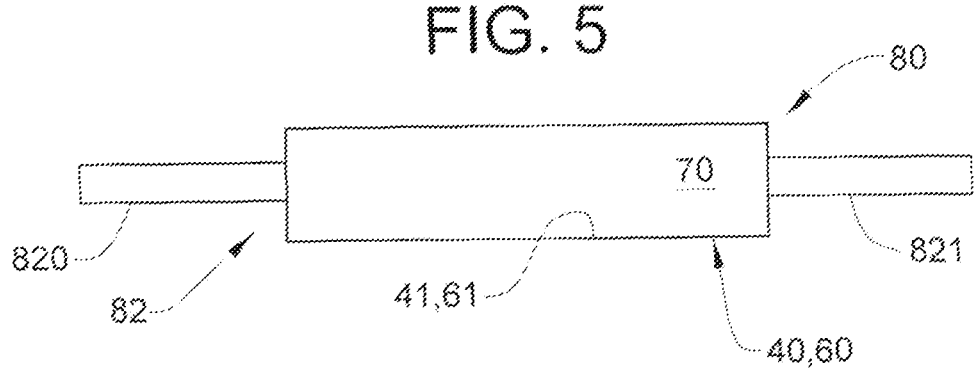
FIG. 5 is a schematic diagram of a plumbing system of an electro-dynamic machine.
Figure 6:
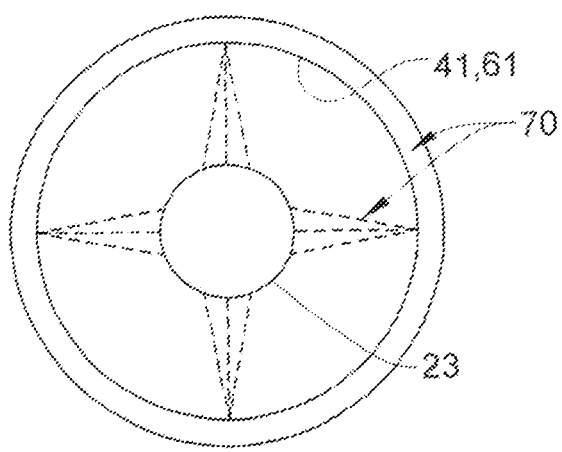
FIG. 6 is a schematic diagram of bladder elements of an electro-dynamic machine.

With reference to FIGS. 4, 5 and 6, the plumbing system 80 may be coupled to one or both of the first and second bladder elements 40 and 60. As noted above, the plumbing system 80 is configured to pressurize the coolant 70 to thereby increase a surface area of contact (i.e., a "contact area") between the respective bladder walls 41, 61 and the end turns 23. As shown in FIG. 4, the plumbing system 80 may include a closed system 81, which is chargeable with non-circulating coolant 70 and may be self-contained. As shown in FIG. 5, the plumbing system 80 may include an open system 82, which is chargeable with circulating coolant 70 and may be self-contained. In either case, as shown in FIG. 6, the respective bladder walls 41, 61 may be perforated such that, as the first and second bladder elements 40 and 60 are charged with coolant 70, some or all of the coolant 70 can be sprayed onto the end turns 23 and then permitted to flow into a drainage system. In accordance with further embodiments, metered amounts of the coolant 70 may be sprayed onto the hottest areas of the end turns 23.

In the closed system 81 of FIG. 4, the first and second bladder elements 40 and 60 are each coupled to a single source 810 of coolant 70. This single source 810 forces coolant 70 into the first and second bladder elements 40 and 60 during cooling operations to thereby pressurize the coolant 70. By contrast, in the open system 82 of FIG. 5 an increased cooling capability is provided for as the first and second bladder elements 40 and 60 are each coupled to an inlet 820 and an outlet 821. The inlets 820 force coolant 70 into the first and second bladder elements 40 and 60 during cooling operations to thereby pressurize the coolant 70 and the outlets 821 permit coolant 70 to be flushed out of the first and second bladder elements 40 and 60 once the coolant 70 has been heated.

Although the respective bladder walls 41, 61 are described above as being formed of compliant, deformable and/or flexible material, it is to be understood that this is not required. Indeed, in accordance with alternative embodiments, the respective bladder walls 41, 61 may be formed of substantially rigid materials that may be highly thermally conductive and non-electrically conductive. In these embodiments, the first and second bladder elements 40 and 60 are disposed with the respective bladder walls 41, 61 of substantially rigid materials being disposed in contact with the end turns 23. As the first and second bladder elements 40 and 60 are charged with the coolant 70, the coolant 70 increases a degree of heat transfer from the end turns 23 to the first and second bladder elements 40 and 60 but a surface area of contact between the respective bladder walls 41, 61 and the ends turns 23 remains substantially constant.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. An electro-dynamic machine, comprising:
   stator assembly end turns; and
   a coolant chargeable bladder disposable to contact the end turns and receptive of coolant, which is pressurizable to increase contact between the bladder and the end turns as a quantity of coolant in the bladder increases.

2. The electro-dynamic machine according to claim 1, wherein the bladder is formed of compliant, deformable and/or flexible materials.

3. The electro-dynamic machine according to claim 1, further comprising a housing to house the stator assembly with the bladder interposable between the housing and the stator assembly.

4. The electro-dynamic machine according to claim 3, further comprising a cooling jacket disposable to support the bladder.

5. The electro-dynamic machine according to claim 1, wherein the end turns have a V-shaped configuration.

6. The electro-dynamic machine according to claim 1, further comprising a closed plumbing system, which is configured to be coupled to the bladder and to charge the bladder with non-circulating coolant.

7. The electro-dynamic machine according to claim 1, further comprising an open plumbing system, which is configured to be coupled to the bladder and to charge the bladder with circulating fluid.

8. The electro-dynamic machine according to claim 1, wherein the bladder is perforated.

9. The electro-dynamic machine according to claim 1, wherein the bladder is formed of substantially rigid materials.

10. An electro-dynamic machine, comprising:
    a stator assembly having end turns configured to carry current in association with rotation of a rotor;
    a bladder element including a bladder wall, which is receptive of coolant and which is disposable to contact the end turns such that the coolant is disposable to remove heat from the end turns into the bladder wall and from the bladder wall into the coolant such that no heat flows directly from the end turns into coolant charging the bladder wall; and
    a plumbing system configured to pressurize the coolant.

11. The electro-dynamic machine according to claim 10, wherein the bladder wall is formed of compliant, deformable and/or flexible materials whereby the pressurized coolant increases a contact area between the bladder wall and the end turns.

12. The electro-dynamic machine according to claim 10, further comprising a housing to house the stator assembly with the bladder element interposable between the housing and the stator assembly.

13. The electro-dynamic machine according to claim 12, further comprising a cooling jacket disposable within the housing to support the bladder element.

14. The electro-dynamic machine according to claim 10, wherein the end turns have a V-shaped configuration.

15. The electro-dynamic machine according to claim 10, wherein the plumbing system is closed and configured to charge the bladder with non-circulating coolant.

16. The electro-dynamic machine according to claim 10, wherein the plumbing system is open and configured to charge the bladder with circulating fluid.

17. The electro-dynamic machine according to claim 10, wherein the bladder wall is perforated.

18. The electro-dynamic machine according to claim 10, wherein the bladder wall is formed of substantially rigid materials.

19. A method of operating an electro-dynamic machine, comprising:

forming a stator assembly having end turns configured to carry current in association with rotor rotation;

disposing a coolant receptive bladder to contact the end turns such that coolant receivable by the bladder is disposable to remove heat from the end turns into the bladder wall and from the bladder wall into the coolant such that no heat flows directly from the end turns into coolant charging the bladder wall; and pressurizing the coolant receivable by the bladder.

20. The method according to claim 19, further comprising charging the bladder with one of non-circulating coolant or circulating coolant.

\* \* \* \* \*